US012603875B2

(12) United States Patent
Kottapalli et al.

(10) Patent No.: US 12,603,875 B2
(45) Date of Patent: Apr. 14, 2026

(54) CONNECTION ESTABLISHMENT USING SHARED CERTIFICATE IN GLOBAL SERVER LOAD BALANCING (GSLB) ENVIRONMENT

(71) Applicant: VMware LLC, Palo Alto, CA (US)

(72) Inventors: Ravi Kumar Reddy Kottapalli, Karnataka (IN); Sudarshana Kandachar Sridhara Rao, Karnataka (IN); Venkata Swamy Babu Budumuru, Andhra Pradesh (IN); Dinesh Kumar Kamalakannan, Karnataka (IN); Prasanna Kumar Subramanyam, Karnataka (IN); Vidya Koteeswaran, Karnataka (IN); Prashant Mishra, Karnataka (IN); Santosh Singh, Karnataka (IN)

(73) Assignee: VMware LLC, Palo Alto, CA (US)

( * ) Notice: Subject to any disclaimer, the term of this patent is extended or adjusted under 35 U.S.C. 154(b) by 85 days.

(21) Appl. No.: 18/377,825

(22) Filed: Oct. 8, 2023

(65) Prior Publication Data
US 2025/0119418 A1      Apr. 10, 2025

(51) Int. Cl.
*H04L 9/40* (2022.01)
*H04L 61/4511* (2022.01)

(52) U.S. Cl.
CPC ...... *H04L 63/0823* (2013.01); *H04L 63/0807* (2013.01); *H04L 61/4511* (2022.05)

(58) Field of Classification Search
None
See application file for complete search history.

(56) References Cited

U.S. PATENT DOCUMENTS

| | | | | |
|---|---|---|---|---|
| 2007/0250631 | A1* | 10/2007 | Bali | H04L 67/1008 |
| | | | | 718/105 |
| 2008/0282254 | A1* | 11/2008 | Blander | H04L 67/1001 |
| | | | | 718/105 |
| 2018/0006827 | A1* | 1/2018 | Naik | H04L 9/3268 |
| 2018/0191625 | A1* | 7/2018 | Golshan | H04L 47/125 |
| 2022/0084692 | A1* | 3/2022 | Wengrovitz | H04L 63/1458 |
| 2022/0368758 | A1* | 11/2022 | Suri | H04L 61/4511 |
| 2025/0117265 | A1 | 4/2025 | Kottapalli et al. | |

* cited by examiner

*Primary Examiner* — Joshua Joo
(74) *Attorney, Agent, or Firm* — King Intellectual Asset Management

(57) ABSTRACT

Example methods and systems for connection establishment in a global server load balancer (GSLB) environment are described. In one example, a computer system may establish a first connection with a first entity and a second connection with the second entity. The first connection may be established based on first parameter information that includes a shared certificate and a first identifier (ID). The second connection may be established based on second parameter information that includes the shared certificate and a second ID. The shared certificate may be shared by multiple entities that include the first entity and a second entity. In response to receiving a first request, a first response may be generated and sent towards the first entity via the first connection. In response to receiving a second request, a second response may be generated and sent towards the second entity via the second connection.

21 Claims, 9 Drawing Sheets

200

400

500

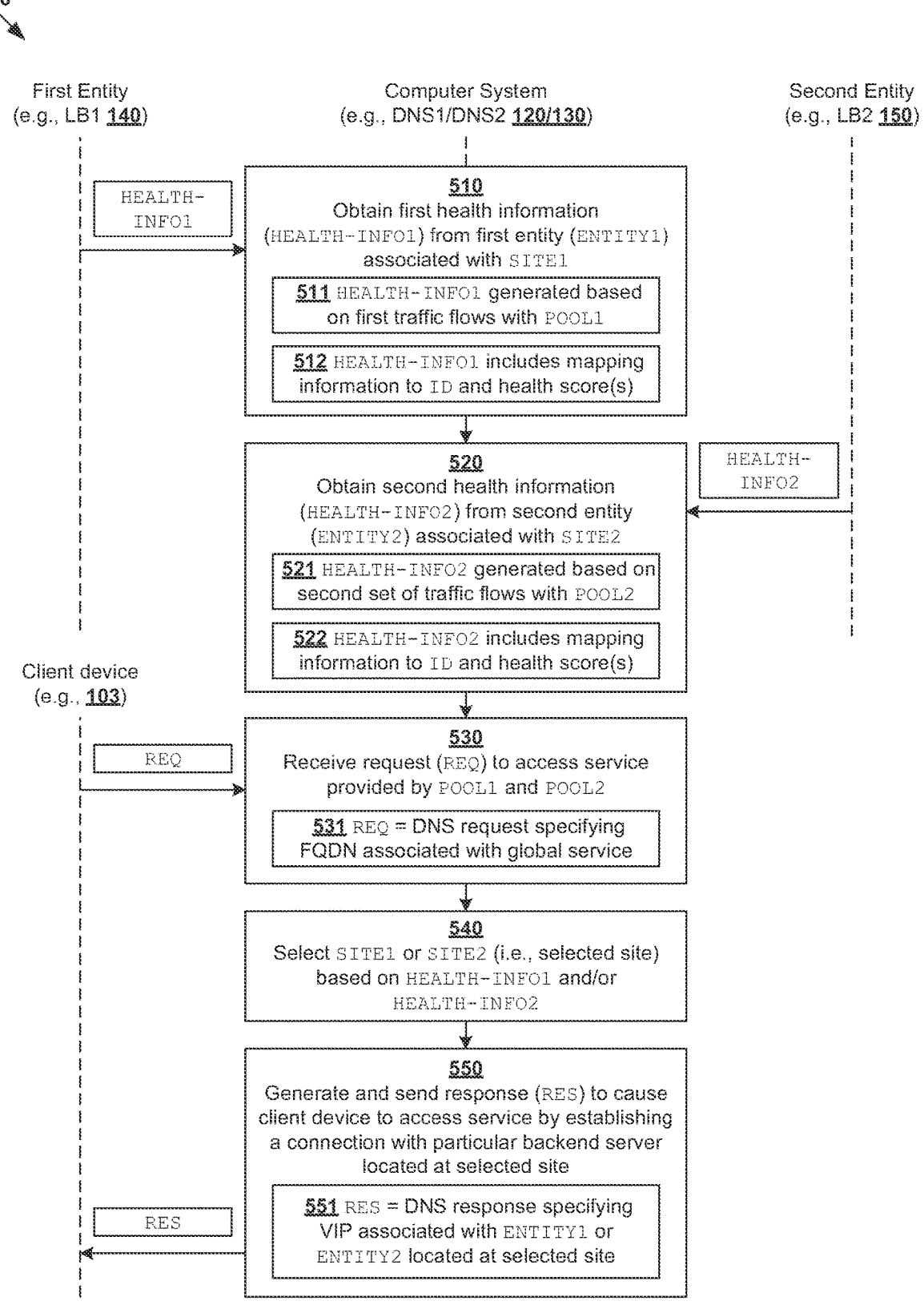

First Entity
(e.g., LB1 140)

Computer System
(e.g., DNS1/DNS2 120/130)

Second Entity
(e.g., LB2 150)

HEALTH-
INFO1

510
Obtain first health information
(HEALTH-INFO1) from first entity (ENTITY1)
associated with SITE1

511 HEALTH-INFO1 generated based
on first traffic flows with POOL1

512 HEALTH-INFO1 includes mapping
information to ID and health score(s)

520
Obtain second health information
(HEALTH-INFO2) from second entity
(ENTITY2) associated with SITE2

521 HEALTH-INFO2 generated based on
second set of traffic flows with POOL2

522 HEALTH-INFO2 includes mapping
information to ID and health score(s)

HEALTH-
INFO2

Client device
(e.g., 103)

REQ

530
Receive request (REQ) to access service
provided by POOL1 and POOL2

531 REQ = DNS request specifying
FQDN associated with global service

540
Select SITE1 or SITE2 (i.e., selected site)
based on HEALTH-INFO1 and/or
HEALTH-INFO2

550
Generate and send response (RES) to cause
client device to access service by establishing
a connection with particular backend server
located at selected site

551 RES = DNS response specifying
VIP associated with ENTITY1 or
ENTITY2 located at selected site

RES

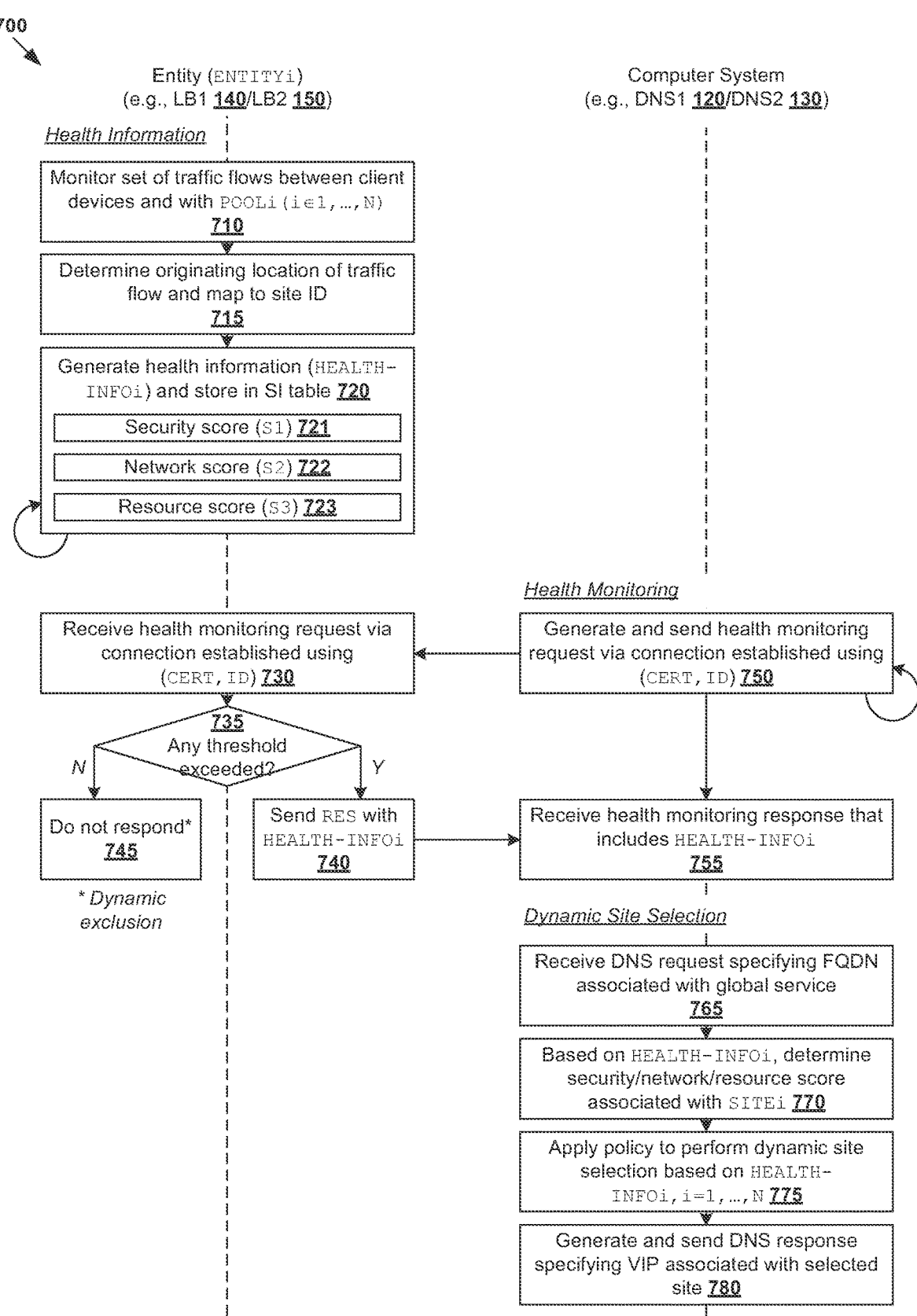

Entity (ENTITYi)
(e.g., LB1 140/LB2 150)

*Health Information*

Monitor set of traffic flows between client devices and with POOLi(i∈1,…,N)
710

Determine originating location of traffic flow and map to site ID
715

Generate health information (HEALTH-INFOi) and store in SI table 720

Security score (S1) 721

Network score (S2) 722

Resource score (S3) 723

Receive health monitoring request via connection established using (CERT,ID) 730

735
Any threshold exceeded?

N

Do not respond*
745

* Dynamic exclusion

Y

Send RES with HEALTH-INFOi
740

Computer System
(e.g., DNS1 120/DNS2 130)

*Health Monitoring*

Generate and send health monitoring request via connection established using (CERT,ID) 750

Receive health monitoring response that includes HEALTH-INFOi
755

*Dynamic Site Selection*

Receive DNS request specifying FQDN associated with global service
765

Based on HEALTH-INFOi, determine security/network/resource score associated with SITEi 770

Apply policy to perform dynamic site selection based on HEALTH-INFOi,i=1,…,N 775

Generate and send DNS response specifying VIP associated with selected site 780

HEALTH-INFO1: *Security-related health information (LB1)* 810

| Client/User ID | Site ID | Global Service | VIP | Security Score | Threshold |
|---|---|---|---|---|---|
| X1 | ID1=US | | VIP-US | S1(US,X1) | 0-75% |
| X2 | ID2=UK | app.xyz.com | VIP-UK | S1(UK,X2) | 0-50% |
| X3 | ID2=UK | | VIP-UK | S1(UK,X3) | 0-50% |

HEALTH-INFO1: *Network-related health information (LB1)* 830

| Client/User ID | Site ID | Global Service | VIP | Network Score | Site Threshold |
|---|---|---|---|---|---|
| X1 | ID1=US | | VIP-US | S2(US,X1) | 0-75% |
| X2 | ID2=UK | app.xyz.com | VIP-UK | S2(UK,X2) | 0-50% |
| X3 | ID2=UK | | VIP-UK | S2(UK,X3) | 0-50% |

HEALTH-INFO1: *Resource-related health information (LB1)* 850

| Client/User ID | Site ID | Global Service | VIP | Resource Score | Site Threshold |
|---|---|---|---|---|---|
| X1 | ID1=US | | VIP-US | S3(US,X1) | 0-75% |
| X2 | ID2=UK | app.xyz.com | VIP-UK | S3(UK,X2) | 0-50% |
| X3 | ID2=UK | | VIP-UK | S3(UK,X3) | 0-50% |

HEALTH-INFO2: *Security-related health information (LB2)* 820

| Client/User ID | Site ID | Global Service | VIP | Security Score | Site Threshold |
|---|---|---|---|---|---|
| Y1 | ID1=US | | VIP-US | S1(US,Y1) | 0-75% |
| Y2 | ID1=US | app.xyz.com | VIP-US | S1(US,Y2) | 0-75% |
| Y3 | ID2=UK | | VIP-UK | S1(UK,Y3) | 0-50% |

HEALTH-INFO2: *Network-related health information (LB2)* 840

| Client/User ID | Site ID | Global Service | VIP | Network Score | Site Threshold |
|---|---|---|---|---|---|
| Y1 | ID1=US | | VIP-US | S2(US,Y1) | 0-75% |
| Y2 | ID1=US | app.xyz.com | VIP-US | S2(US,Y2) | 0-75% |
| Y3 | ID2=UK | | VIP-UK | S2(UK,Y3) | 0-50% |

HEALTH-INFO2: *Resource-related health information (LB2)* 860

| Client/User ID | Site ID | Global Service | VIP | Resource Score | Site Threshold |
|---|---|---|---|---|---|
| Y1 | ID1=US | | VIP-US | S3(US,Y1) | 0-75% |
| Y2 | ID1=US | app.xyz.com | VIP-US | S3(US,Y2) | 0-75% |
| Y3 | ID2=UK | | VIP-UK | S3(UK,Y3) | 0-50% |

| Site ID | Site-level Health Information |
|---|---|
| 870 ID1=US | S1(US)=f(S1(US,*)), S2(US)=f(S2(US,*)), S3(US)=f(S3(US,*)) |
| 880 ID2=UK | S1(UK)=f(S1(UK,*)), S2(UK)=f(S2(UK,*)), S3(UK)=f(S3(UK,*)) |

Fig. 8

CONNECTION ESTABLISHMENT USING SHARED CERTIFICATE IN GLOBAL SERVER LOAD BALANCING (GSLB) ENVIRONMENT

CROSS REFERENCE TO RELATED APPLICATION

The present application is related in subject matter to U.S. patent application Ser. No. 18/377,826, which is incorporated herein by reference.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, global service(s) or application(s) may be deployed in a global server load balancing (GSLB) environment that includes multiple sites. It is desirable to improve the performance relating to the monitoring and delivery of the global service(s).

BRIEF DESCRIPTION OF DRAWINGS

FIG. 5 is a schematic diagram illustrating a second example of a GSLB environment in which dynamic site selection may be performed;

FIG. 7 is a flowchart of an example detailed process for a computer system to perform dynamic site selection in a GSLB environment;

FIG. 8 is a schematic diagram illustrating example health information for dynamic site selection.

DETAILED DESCRIPTION

According to a first aspect, examples of present disclosure may provide method(s) for a computer system (e.g., load balancer 140/150 in FIG. 1) to perform connection establishment in a global server load balancer (GSLB) environment that includes at least a first site (e.g., US site 101) and a second site (e.g., UK site 102). One example may involve the computer system establishing a first connection with a first entity (e.g., first health monitor 121) associated with the first site and a second connection with a second entity (e.g., second health monitor 131) associated with the second site.

To reduce the likelihood of certificate scaling and related performance issues, the first connection and the second connection may be established based on a shared certificate that is shared by multiple entities, which include the first entity and the second entity. The first connection (e.g., see 171-172 in FIG. 1) may be established based on first parameter information that includes (a) a shared certificate and (b) a first identifier (ID) that is uniquely associated with the first entity or the first site. The second connection (see 173-174 in FIG. 1) may be established based on second parameter information that includes (a) the shared certificate and (b) a second ID that is uniquely associated with the second entity or the second site.

Figure 1:
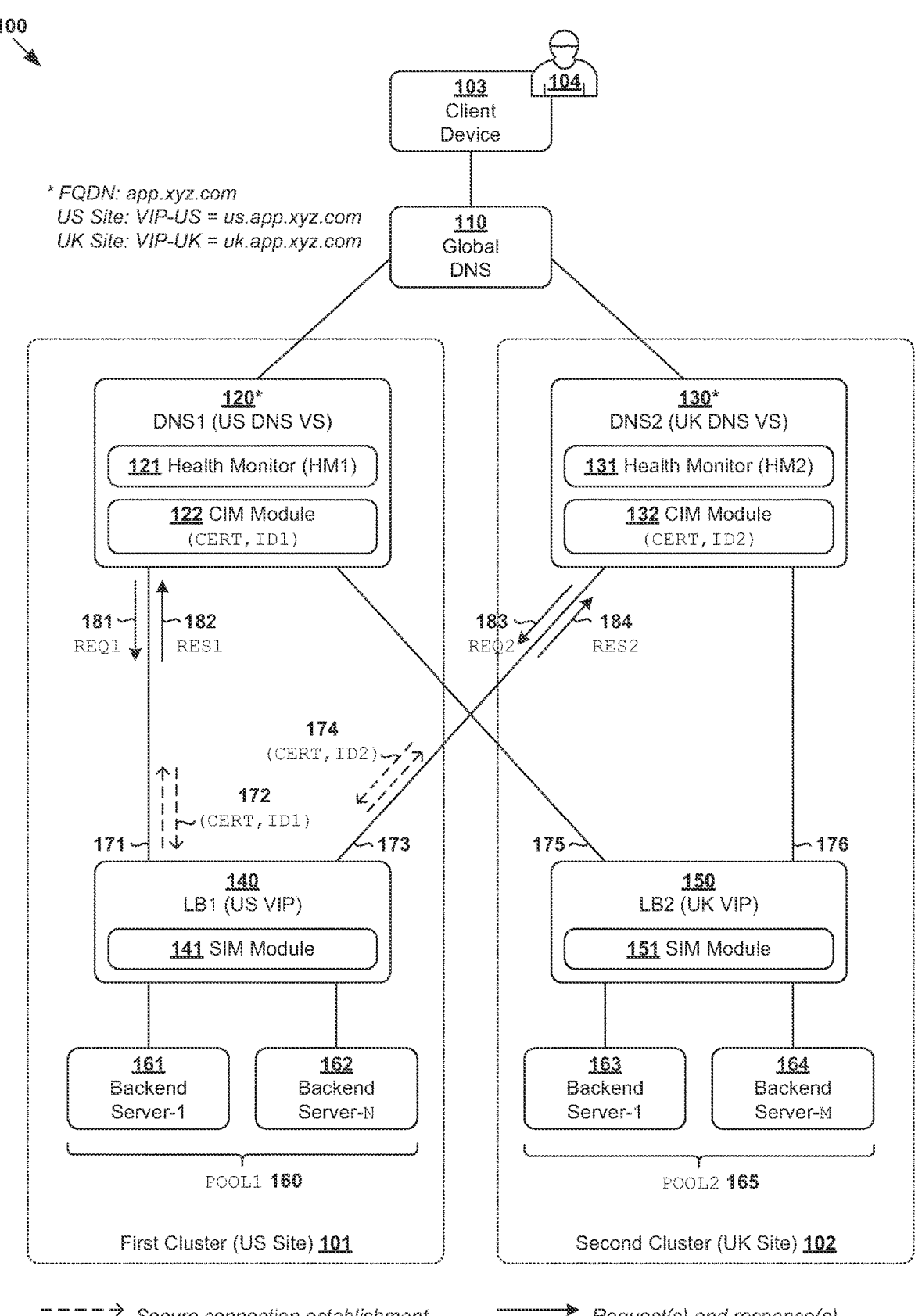
FIG. 1 is a schematic diagram illustrating a first example of a global server load balancing (GSLB) environment in which connection establishment using a shared certificate may be performed.

In response to receiving a first request from the first entity associated with the first site via the first connection, the computer system may generate and send a first response towards the first entity via the first connection (e.g., see 181-182 in FIG. 1). In response to receiving a second request from the second entity associated with the second site via the second connection, the computer system may generate and send a second response towards the second entity via the second connection (e.g., see 183-184 in FIG. 1). Using examples of the present disclosure, the computer system may distinguish between multiple entities sharing the same certificate based on their respective IDs. Various examples of the first aspect will be described using FIGS. 1-4.

According to a second aspect, examples of present disclosure may provide method(s) for a computer system (e.g., DNS server 120/130 in FIG. 1) to perform dynamic site selection in a GSLB environment that includes at least a first site and a second site. One example may involve the computer system obtaining first health information from a first entity (e.g., first load balancer 140) associated with the first site and second health information from a second entity (e.g., second load balancer 150) associated with the second site. The first health information (see 610 in FIG. 6) may be generated based on multiple first traffic flows between (a) multiple first client devices accessing a service and (b) a first pool of backend servers providing the service at the first site (e.g., 601 and 603 in FIG. 6). The second health information (see 620 in FIG. 6) may be generated based on multiple second traffic flows between (a) multiple second client devices accessing the service and (b) a second pool of backend servers providing the service at the second site (e.g., 602 and 604 in FIG. 6).

Figure 6:
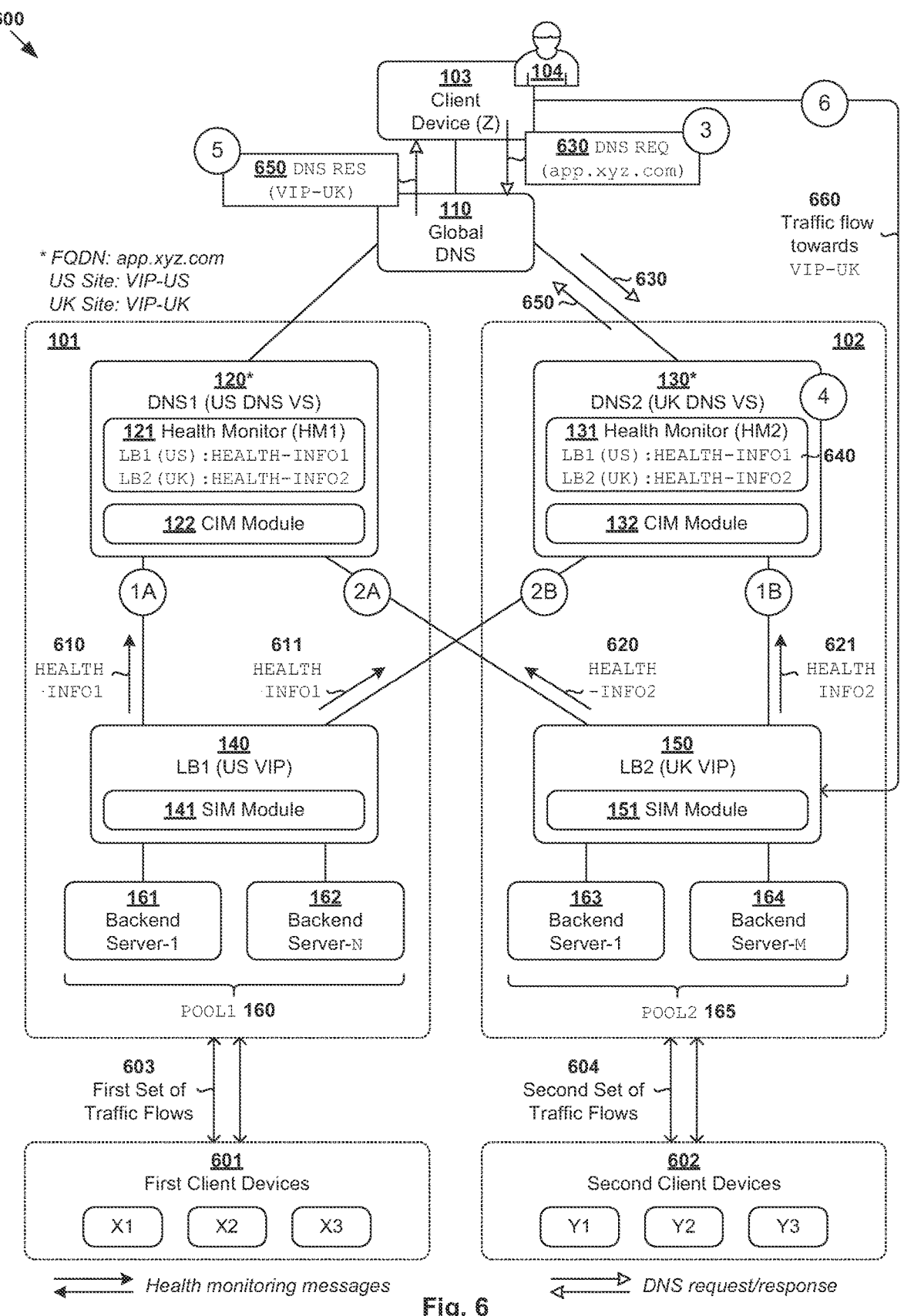
FIG. 6 is a flowchart of an example process for a computer system to perform dynamic site selection in a GSLB environment.

In response to receiving a request from a third client device (e.g., 103 in FIG. 6) to access the service provided by both the first pool and the second pool, the computer system may select the first site or the second site, being a selected site, based on the first health information or the second health information, or both (see 630-640 in FIG. 6). Further, the computer system may generate and send a response towards the third client device to cause the third client device to access the service by directing a third traffic flow towards the selected site (see 660 in FIG. 6). Using examples of the present disclosure, dynamic site selection may be implemented to deliver global service(s) to end users in an improved manner based on health information derived from application traffic patterns. Various examples will be discussed below using FIGS. 5-8.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

Example GSLB Environment

FIG. 1 is a schematic diagram illustrating a first example of GSLB environment 100 in which connection establishment based on a shared certificate may be performed. It should be understood that, depending on the desired implementation, GSLB environment 100 may include additional and/or alternative components than that shown in FIG. 1. As used herein, the term "global server load balancing" or "GSLB" may refer generally to an approach or technology for distributing an application's load or traffic across multiple clusters or sites that are geographically dispersed. The term "GSLB environment" may refer generally to a multi-site network environment in which GSLB is implemented. In the following, example GSLB environment 100 that includes K=2 sites will be described using FIGS. 1-8. In practice, any number (K) of sites may be configured. Each site may include a domain name system (DNS) server, a load balancer and a pool of backend servers. At each site, any suitable number of backend servers may be assigned to a particular pool that is accessible via its load balancer. Any suitable number of global services may be supported in GSLB environment 100.

In the example in FIG. 1, a global service may be deployed in GSLB environment 100 that includes multiple GSLB clusters or sites, including a first GSLB site located in the United States (US) region (see "US Site" 101) and a second GSLB site located in the United Kingdom (UK) region (see "UK Site" 102). The global service may be an application that is accessible via a website (e.g., www.app.xyz.com). The global service may be available to users in multiple geographical locations, such as user 104 operating client device 103 (one shown for simplicity). Depending on the desired implementation, site 101/102 may represent a data center (e.g., on-premises) or cloud (private or public) in which an instance of the application is deployed. In practice, multi-cluster application deployment has become a paradigm for high availability and disaster recovery scenarios. Any suitable technology for application deployment may be used.

GSLB environment 100 may further include global DNS server 110 to perform domain name resolution and steer traffic across multiple sites that include first site 101 and second site 102. To access the application, a client device 140 operated by user 141 may perform a DNS query to map a fully qualified domain name (FQDN)="www.app.xyz-.com" to an Internet Protocol (IP) address. A hierarchical tree of DNS resolvers may eventually identify global DNS server 110 associated with "www.xyz.com." In response to receiving a DNS request for "www.app.xyz.com," global DNS 110 may forward the DNS request to one of multiple GSLB DNS servers, including first DNS server 120 (denoted as "DNS1") located at US site 101 and second DNS server (denoted as "DNS2") located at UK site 102. Each DNS server 120/130 may respond to the DNS request with a virtual IP (VIP) address associated with either US site 101 or UK site 102 based on any suitable factor(s). DNS1 120 and DNS2 130 may also be referred to as authoritative/corporate DNS servers or DNS virtual services.

In GSLB environment 100, traffic steering may be implemented using multiple load balancers, including first load balancer 140 (denoted as "LB1") at US site 101 and second load balancer 150 at UK site 102. Each load balancer 140/150 may be implemented as a virtual service and assigned with a VIP. For example, DNS server 120/130 may respond to the DNS request with a DNS response specifying first VIP address=VIP-US (e.g., us.app.xyz.com) associated with LB1 140, thereby directing application traffic towards US site 101. Alternatively, DNS server 120/130 may respond with a DNS response specifying second VIP address=VIP-UK (e.g., uk.app.xyz.com) associated with LB2 150 to steer application traffic towards UK site 102. An FQDN entry may map domain name="www.app.xyz.com" to both VIP-US and VIP-UK.

At US site 101, LB1 140 may be capable of selecting one of multiple (N) backend servers 161-162 from first pool 160 (POOL1) to handle application traffic. Similarly, at UK site 102, LB2 150 may be capable of selecting one of multiple (M) backend servers 163-164 from second pool 165 (POOL2) to handle application traffic. Any suitable technology may be implemented in GSLB environment 100, such as cloud-native Avi Vantage platform in which case an AVI controller cluster is deployed in each site 101/102. Throughout the present disclosure, the term "backend server" may refer generally to a physical machine (bare metal machine), or a virtualized computing instance, such as a Kubernetes pod, etc. In general, a pod is the smallest execution unit in Kubernetes, such as a virtual machine (VM) with a small footprint that runs one or more containers. Some example VMs will be discussed using FIG. 9.

Examples of the present disclosure may be implemented together with any suitable GSLB solution(s), including but not limited to VMware NSX® Advanced Load Balancer™ (ALB) that is available from VMware, Inc.; AVI Vantage, AVI Kubernetes Operator (AKO) and AVI multi-cluster Kubernetes Operator (AMKO) from AVI Networks™ (trademark of VMware, Inc.), etc. In general, AKO may refer to a pod running in Kubernetes clusters that provides communication with a Kubernetes master to provide configuration. AKO may remain in synchronization with required Kubernetes objects and calls application programming interfaces (APIs) provided by an AVI controller to deploy ingress services via AVI service engines. The AMKO may be implemented to facilitate multi-cluster deployment to extend application ingress controllers across multiple regions. AMKO may call APIs for AVI controller to create GSLB services on a leader cluster that synchronizes with follower clusters.

Certificate Scaling in GSLB Environment

To monitor the health status of each site 101/102, a health monitoring service may be attached to each global service (e.g., app.xyz.com) supported by GSLB environment 100. Depending on the desired implementation, multiple instances (see 121, 131) of the health monitoring service may be deployed. For example, DNS1 120 at US site 101 may implement first health monitor 121 (denoted as "HM1")

and DNS2 130 at UK site 102 second health monitor 131 (denoted as "HM2"). To perform health monitoring, various connections (see 171, 173 and 175-176 in FIG. 1) may be established between health monitor 121/131 acting as a client and load balancer 140/150 acting as a server.

Any suitable security protocol may be used to establish secure connections or communication sessions between a client and a server, such as secure sockets layer (SSL), transport layer security (TLS), mutual TLS (mTLS), etc. For example, TLS is an encryption and authentication protocol that is designed to secure Internet-based communications. A TLS handshake is a process that initiates a communication session based on TLS. During a TLS handshake, a client may send a synchronization (SYN) packet to a server, who responds with a synchronization acknowledgement (SYN ACK) packet. Then the client may send an ACK packet along with a CLIENT HELLO to the server. In response to the CLIENT HELLO, the server may send its TLS certificate (i.e., server's certificate) to the client for verification. The certificate may be issued by a certificate authority (CA), which is a trusted third party that issues certificates. Once the client verifies the server's identity, encrypted communication may start. The TLS handshake process relies on single-side trust, where only the server is required to present its certificate to the client.

To improve security, mTLS (i.e., an extension of TLS) may be implemented to ensure that both parties authenticate each other. This is called two-side trust and means that both the server and the client need to have a valid certificate in order to establish a secure connection. During an mTLS handshake, the client may provide security information that includes a client's certificate for the server to verify the client's identity. The server may provide a server's certificate for the client to verify the server's identity. The client's certificate and server's certificate may be issued by any suitable CA(s). Overall, mTLS helps ensure that traffic is secure and trusted in both directions between the client and the server (known as zero trust). This provides an additional layer of security compared to TLS to reduce the likelihood of security attacks (e.g., man in the middle attacks).

Conventionally, certificate scaling and performance issues may be observed in GSLB environment 100 with, for example, X=number of health monitors per global service, Y=number of global services (e.g., applications) and Z=number of sites. In this case, the number of unique client certificates required would be X*Y*Z. For example, suppose X=2, Y=10000 and Z=8, the number of certificates required would be X*Y*Z=160000. In the case of high availability (HA) implementation, the number of certificates may increase to 320000 using two service engines that each support Y=10000 global services for redundancy purposes. Such certificate scaling and performance issues are undesirable.

First Aspect: Connection Establishment Based on Shared Certificate

According to a first aspect of the present disclosure, a shared certificate may be configured for multiple entities (e.g., health monitors 121, 131 acting as clients) to reduce the likelihood of certificate scaling and related performance issues in GSLB environment 100. As used herein, the term "certificate" may refer generally to security information (e.g., digital file) that is issued by a CA for one entity (e.g., server) to verify the identity of another entity (e.g., client). In practice, the certificate may include the name of the entity, public key information, digital signature of the CA, expiration date of the certificate, etc. The term "shared certificate" may refer generally to a single certificate shared by multiple entities (e.g., clients) in that the shared certificate may be used to verify the identity of the multiple entities. The term "entity" may refer generally to any suitable node capable of acting as a client or server in a connection or communication session. An "entity" may be implemented using software and/or hardware, such as virtualized computing instance (e.g., VM, container), physical machine, etc.

To help a computer system (e.g., acting as a server) to distinguish among multiple entities (e.g., acting as clients) from different sites, an identifier (ID) that is uniquely associated with a particular entity and/or a particular site may be used as connection parameter information. For example, in federated GSLB environment 100, one site may be configured as a leader site and other site(s) as non-leader site(s), such as leader US site 101 and non-leader UK site 102. In this case, a shared certificate may be federated from leader US site 101 and non-leader UK site 102 via any suitable management channel. By configuring the shared certificate, the number of unique certificates required may be reduced to X*Y (i.e., a reduction by a factor of Z). In the case of Z=2 in FIG. 1, the number of certificates may be reduced by half, thereby ameliorating the certificate scaling and performance issues in GSLB environment 100.

Some examples will be described using FIG. 2, which is a flowchart of example process 200 for a computer system to perform connection establishment based on a shared certificate in GSLB environment 100. Example process 200 may include one or more operations, functions, or actions illustrated by one or more blocks, such as 210 to 260. Depending on the desired implementation, various blocks may be combined into fewer blocks, divided into additional blocks, and/or eliminated. In the following, various examples will be explained using computer system=load balancer 140/150 acting a server, first entity=first health monitor (HM1) 121 associated with first site=US site 101 and second entity=second health monitor (HM2) 131 associated with second site=UK site 102. Each health monitor 121/131 may act as a client to establish a connection with load balancer 140/150 acting as a server.

Figure 2:
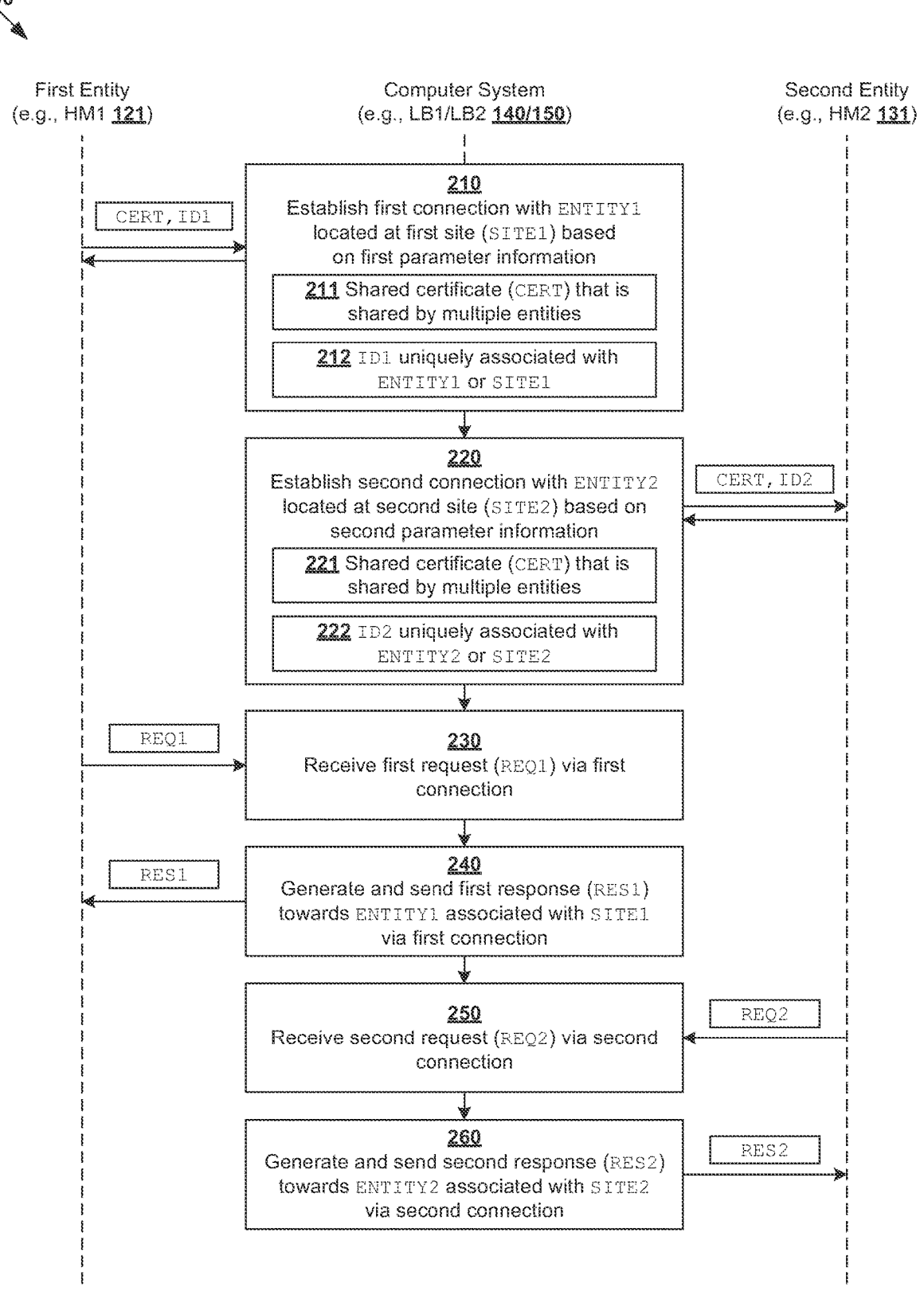
FIG. 2 is a flowchart of an example process for a computer system to perform connection establishment using a shared certificate in a GSLB environment.

At 210 in FIG. 2, first load balancer 140 may establish a first connection with first entity=HM1 121 associated with first site 101. In the example in FIG. 1, first connection 171 may be established based on first parameter information 172 that includes (CERT, ID1), where (a) CERT=shared certificate and (b) ID1=first ID that is uniquely associated with HM1 121 and/or first site 101, such as ID1=US (i.e., site ID). See also 211-212 in FIG. 2.

At 220 in FIG. 2, first load balancer 140 may establish a second connection with second entity=HM2 131 associated with second site 102. In the example in FIG. 1, second connection 173 may be established based on second parameter information 174 that includes (CERT, ID2), where (a) CERT=shared certificate at block 210 and (b) ID2=second ID that is uniquely associated with HM2 131 and/or second site 102, such as ID2=UK (i.e., site ID). See also 221-222 in FIG. 2.

At 230-240 in FIG. 2, in response to receiving a first request (denoted as "REQ1") from first entity=HM1 121 via first connection 171, first load balancer 140 may generate and send a first response (denoted as "RES1") towards HM1 121. Note that blocks 230-240 may be performed at any time after establishing first connection 171 at block 210 (i.e., before or after block 220). See 191-192 in FIG. 1.

At 250-260 in FIG. 2, in response to receiving a second request ("REQ2") from second entity=HM2 131 via second connection 172, first load balancer 140 may generate and send a second response ("RES2") towards HM2 131. Blocks 250-260 may be performed at any time after establishing second connection 173 at block 220 (i.e., before or after blocks 230-240). See 193-194 in FIG. 1.

Examples of the present disclosure may also be performed by any suitable "computer system" in GSLB environment 100. Besides first load balancer 140, second load balancer 150 may also establish connection with multiple entities using a shared certificate. For example in FIG. 1, second load balancer 150 may establish first connection 175 with HM1 121 and second connection 176 with HM2 131 based on a shared certificate. First connection 175 may be established based on first parameter information that includes (CERT, ID1). Second connection 176 may be established based on second parameter information that includes (CERT, ID2). Here, CERT=shared certificate that is being shared by HM1 121 and HM2 131, ID1=unique ID associated with HM1 121 and/or first site 101 and ID2=unique ID associated with HM2 131 and/or second site 102. This way, second load balancer 150 may respond to request(s) from health monitor 121/131 via connection 173/174.

As will be discussed further using FIGS. 4-5, the example in FIG. 2 may be implemented to facilitate health monitoring of a global service. In this case, health monitors 121, 131 may generate and send request(s) to load balancers 140, 150 for health information request via various connections 171, 173 and 175-176. In response, first load balancer 140 may generate and send health information to health monitor 121/131 via connection 171/173. Similarly, second load balancer 140 may generate and send health information associated with backend servers 163-164 to health monitor 121/131 via connection 175/176. As will be described below, the health information may be used to facilitate domain name resolution and dynamic site selection.

Health Monitoring Example

Examples of the present disclosure may be implemented to facilitate health monitoring of a global service provided by first pool 160 of backend servers 161-162 and second pool 165 of backend servers 163-164. The health information may be used for health-aware domain name resolution by first DNS server 120 and second DNS server 130 to determine whether to direct application traffic towards LB1 140 or LB2 150. Some examples will be discussed using FIGS. 3-4.

Figure 3:
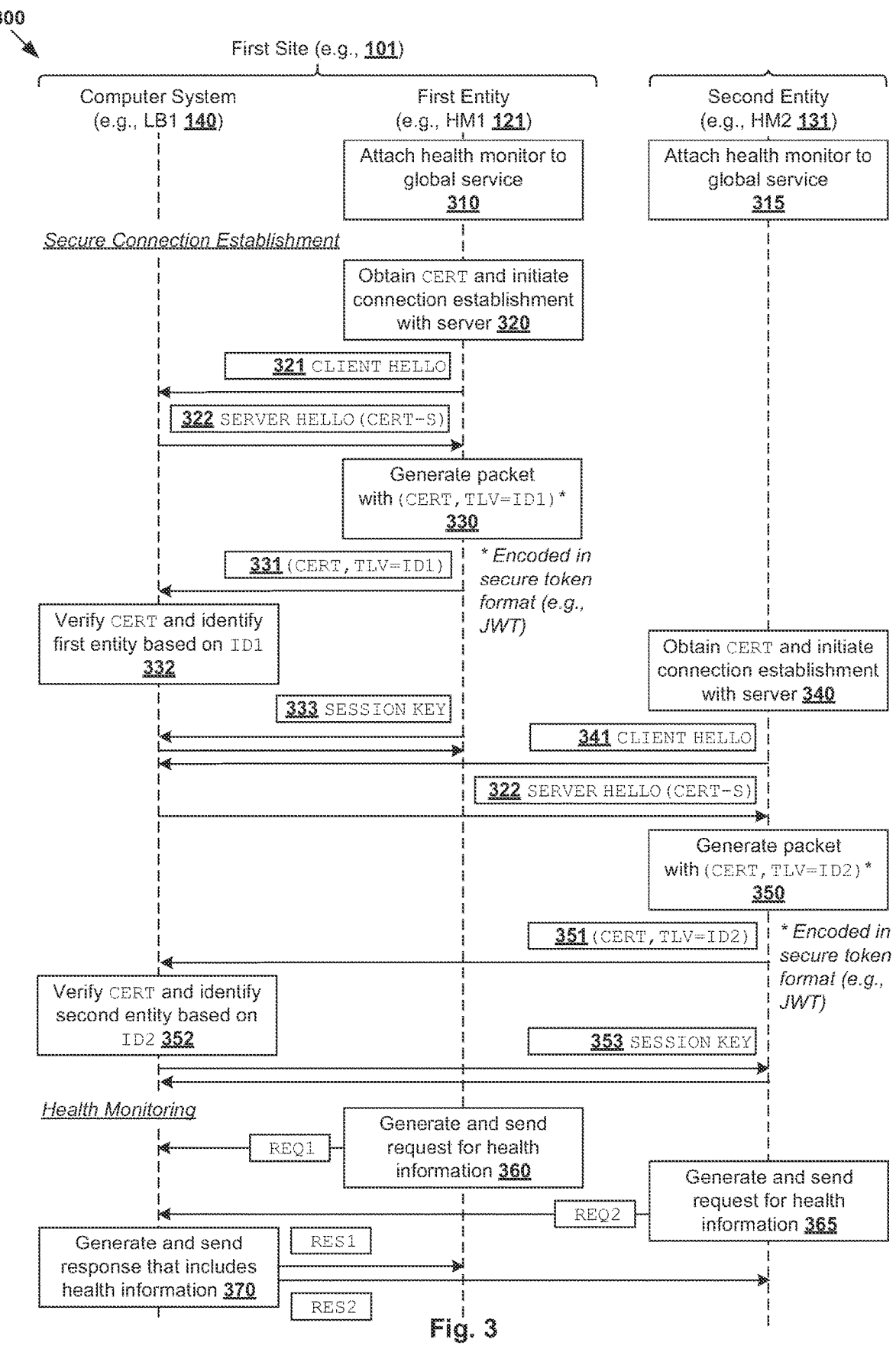
FIG. 3 is a flowchart of an example detailed process for a computer system to perform connection establishment using a shared certificate in a GSLB environment.

In more detail, FIG. 3 is a flowchart of example detailed process 300 for computer system 140/150 to perform connection establishment using a shared certificate in GSLB environment 100. Example process 300 may include one or more operations, functions, or actions illustrated by one or more blocks, such as 310 to 370. Depending on the desired implementation, various blocks may be combined into fewer blocks, divided into additional blocks, and/or eliminated. The example in FIG. 4 will be described using FIG. 4, which is a schematic diagram illustrating example 300 of connection establishment based on shared certificate.

(a) Health Monitoring Service Configuration

At 310-315 in FIG. 3, multiple health monitors that include HM1 121 and HM2 131 may be attached to a global service associated with FQDN=app.xyz.com on global DNS 110. HM1 121 and HM2 131 may be configured to implement a health monitoring service in a client-server approach. In particular, health monitor 121/131 may be configured to act as a client to connect to first server=LB1 140 to obtain first health information associated with first pool 160 at US site 101. Further, health monitor 121/131 may be configured to act as a client to connect to second server=LB2 150 to obtain health information associated with second pool 165 at UK site 102.

Figure 4:
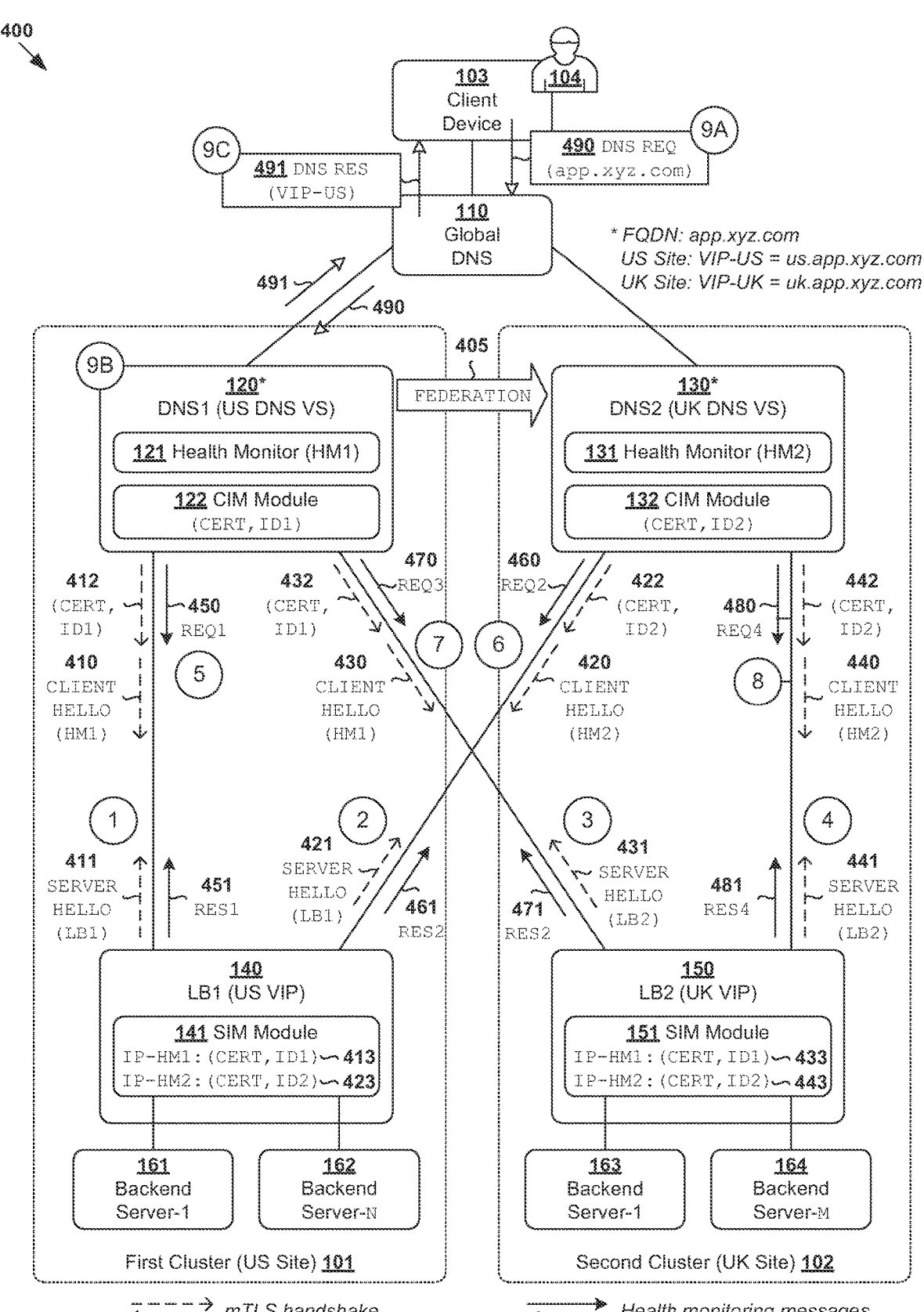
FIG. 4 is a schematic diagram illustrating an example connection establishment based on a shared certificate in a GSLB environment according to the example in FIG. 3.

In the example in FIG. 4, a shared client's certificate may be federated from leader site=US site 101 to non-leader site=UK site 102 (see 405), such as via a secure management channel (not shown) connecting sites 101-102 via a management plane or control plane. The shared certificate may be issued by a CA and provided to HM1 121 at leader site=US site 101 by any suitable management entity. Certificate federation may be performed when health monitors 121, 131 are attached with an mTLS profile. The shared client certificate may be issued by any suitable CA for verification by load balancers 140, 150 acting as servers. Certificate sharing may be implemented to reduce the likelihood of certificate scaling and associated performance issues.

(b) Secure Connection Establishment Between LB1 and HM1

At 320-321 in FIG. 3, first client=HM1 121 may initiate a handshake process to initiate the establishment of a secure session or connection with server=LB1 140. Using mTLS as an example, HM1 121 may send a "CLIENT HELLO" packet that includes the client's random value (e.g., byte string) and supported cipher suites. Next, at 322, LB1 140 may respond with a "SERVER HELLO" packet that includes the server's random value along with the server's certificate (denoted as "CERT-S") to the client. Based on the server's digital certificate, HM1 121 may verify the identity of LB1 140 and check to ensure that the certificate is not expired, not revoked and its CA may be trusted. See also 410-411 in FIG. 4.

At 330-331 in FIG. 3, HM1 121 may generate and send a further connection establishment packet that includes (CERT, ID1), where CERT=shared certificate and ID1=US (i.e., site ID) in a type-length-value (TLV) option field in the packet. Block 330 may be performed using first client identity module (CIM) 122 associated with HM1 121. For example, CIM 122 may mark ID1=US (i.e., site ID) in the shared certificate in the TLV option field of the mTLS packet. CIM 122 may be implemented as part of HM1 121, or a separate module on DNS1 120 as shown in FIG. 4. See also 412 in FIG. 4.

At 332 in FIG. 3, in response to decoding ID1 from the connection establishment packet, LB1 140 may associate HM1 121 (e.g., IP address=IP-HM1) with (CERT, ID1). LB1 140 may perform identity verification of HM1 121 by checking that the shared certificate is not expired, not revoked and its CA may be trusted. Further, at 333, both client=HM1 121 and server=LB1 140 may exchange session key information. The session key may be used to encode and decode any packets sent during a session, thereby protecting message privacy, message integrity and server security. When the session ends, the session key is deleted.

(c) Secure Connection Establishment Between LB1 and HM2

At 340-341 in FIG. 3, second client=HM2 131 may initiate a handshake process to initiate the establishment of a secure connection with server=LB1 140. Using mTLS as an example, HM2 131 may send a "CLIENT HELLO" packet that includes the client's random value (e.g., byte string) and supported cipher suites. Next, at 342, LB1 140 may respond with a "SERVER HELLO" packet along with its digital certificate (denoted as "CERT-S"). Based on the server's digital certificate, HM2 131 may verify the identity of LB1 140 and check to ensure that the certificate is not expired, not revoked and its CA may be trusted. See also 420-421 in FIG. 4.

At 350-351 in FIG. 3, HM2 131 may generate and send a connection establishment packet that includes (CERT, ID2), where CERT=shared certificate and ID2=UK in a TLV option field. Block 350 may be performed using second CIM 132 associated with HM2 131. For example, CIM 132 may mark ID2=US (i.e., site ID) in the shared certificate in the TLV option field of the mTLS packet. CIM 132 may be implemented as a separate module on DNS2 130 (shown in FIG. 4) or as part of HM2 131. See also 422 in FIG. 4.

At 352 in FIG. 3, in response to decoding ID2 from the connection establishment packet, LB1 140 may associate HM2 131 (e.g., IP address=IP-HM2) with (CERT, ID2). LB1 140 may perform identity verification of HM2 131 by checking the shared certificate to verify the identity of HM2 131. Further, at 353, both client=HM2 131 and server=LB1 140 may exchange session key information for encode/decode various packets during the session.

Using examples of the present disclosure, LB1 140 may be able to distinguish between HM1 121 and HM2 131 sharing the same digital certificate during connection establishment. As shown in FIG. 4, LB1 140 may generate and store mapping information that associates (a) HM1 121 (e.g., IP address=IP-HM1) with (CERT, ID1=US) and (b) HM2 131 (e.g., IP-HM2) with (CERT, ID2=UK). See 413 and 423 in FIG. 4.

Depending on the desired implementation, (CERT, ID1) at block 330 and (CERT, ID2) at block 350 may be encoded in a secure token format, such as JSON web token (JWT) format, etc. In practice, there are several benefits of encoding in JWT format. In terms of security, JWT tokens are signed and encrypted, which makes them more secure. In terms of compactness, JWT tokens are generally small and lightweight for transmission. In terms of flexibility, JWT tokens may be used to carry a variety of information in addition to digital certificate information and ID information.

(d) Secure Connection Establishment with LB2

Blocks 320-322 and 330-333 may be repeated by client=HM1 121 and server=LB2 150 to establish a secure connection between them. In this case, HM1 121 may provide LB2 150 with (CERT, ID1), where ID1=US associated with HM1 121 and US site 101. This way, LB2 150 may identity HM1 121 based on ID1 and associate HM1 121 (e.g., IP address=IP-HM1) with (CERT, ID1). See also 430-432 in FIG. 4.

Blocks 340-342 and 350-353 may be repeated by client=HM2 131 and server=LB2 150 to establish a secure connection between them. Similarly, HM2 131 may provide LB2 150 with (CERT, ID2), where ID2-UK associated with HM2 131 and UK site 102. This way, LB2 150 may distinguish HM2 131 from HM1 121 based on ID2. LB2 150 may also associate HM2 131 (e.g., IP address=IP-HM2) with (CERT, ID2). See also 441-443 in FIG. 4.

Again, using examples of the present disclosure, LB2 150 may be able to distinguish between HM1 121 and HM2 131 sharing the same digital certificate during connection establishment. Similarly, in the example in FIG. 4, LB2 150 may generate and store mapping information that associates (a) HM1 121 (e.g., IP address=IP-HM1) with (CERT, ID1=US) and (b) HM2 131 (e.g., IP-HM2) with (CERT, ID2=UK). See 433 and 443 in FIG. 4.

(d) Health Monitoring

Blocks 360-370 in FIG. 3 may be performed to facilitate health monitoring in GSLB environment 100. For example, in response to receiving a request from health monitor 121/131, LB1 140 may generate and send a response that includes first health information associated with backend servers 161-162 at US site 101. See 450-451 (i.e., REQ1 and RES1) and 460-461 (i.e., REQ2 and RES2) in FIG. 4.

Similarly, in response to receiving a request from health monitor 121/131, LB2 150 may generate and send a response that includes second health information associated with backend servers 163-164 at UK site 102. See 470-471 (i.e., REQ3 and RES3) and 480-481 (i.e., REQ4 and RES4) in FIG. 4.

Health monitor 121/131 may provide the collected health information to its local DNS server 120/130 to facilitate domain name resolution and dynamic site selection. Any suitable health information may be collected by LB1 140 and LB2 150 to facilitate site selection by DNS1 120 and DNS2 130. For example in FIG. 4, in response to receiving a DNS request (see 490) specifying FQDN=app.xyz.com from client device 103 operated by user 104, global DNS server 110 may forward the DNS request to either DNS1 120 at US site 101 (as shown) or DNS2 130 at UK site.

In response to receiving DNS request 490, DNS1 120 may perform site selection based on health information collected by LB1 140 and LB2 150. If US site 101 is selected, DNS1 120 may generate and send a DNS response (see 491) specifying VIP-US=virtual IP address associated with LB1 140 towards client device 103 (as shown in FIG. 4). Otherwise (i.e., selected site=UK site 102), DNS response 491 may specify VIP-UK=virtual IP address associated with LB2 150. Some examples for dynamic site selection will be described using FIGS. 5-8.

Second Aspect: Dynamic Site Selection

According to a second aspect of the present disclosure, dynamic site selection may be performed based on health information in GSLB environment 100 to improve global service delivery. The health information may be generated based on traffic patterns, particularly traffic flows between client devices and backend servers 161-164 in the example in FIG. 6. Here, the term "traffic flow" may refer to a group of packets that are transmitted between a particular client device (e.g., acting as a client) and a particular server (e.g., one of backend servers 161-164) to access a service provided by the server. The term "client device" may be any suitable device that is capable of acting as a client or user to access a service.

In more detail, FIG. 5 is a flowchart of example process 500 for a computer system to perform dynamic site selection in GSLB environment 100. Example process 500 may include one or more operations, functions, or actions illustrated by one or more blocks, such as 510 to 550. Depending on the desired implementation, various blocks may be combined into fewer blocks, divided into additional blocks, and/or eliminated. The example in FIG. 5 will be explained using FIG. 6, which is a schematic diagram of a second example GSLB environment 500 in which dynamic site selection may be performed. Here, any suitable "computer system" (e.g., DNS server 120/130) may be configured to perform dynamic site selection according to examples of the present disclosure. DNS server 120/130 may include any suitable software and/or hardware to implement the example in FIG. 6, such as server identity module (SIM) 122/132, health monitor 121/131, etc.

At 510-511 in FIG. 5, DNS server 120/130 may obtain first health information from first entity=LB1 140 associated with first site=US site 101. In the example in FIG. 6, first health information 610 may be generated based on multiple first traffic flows (see 603) between (a) multiple first client devices accessing a global service and (b) first pool 160 of first backend servers 161-162 providing the global service at US site 101. Example first client devices (see 601) may include X1, X2 and X3 in FIG. 6.

At 520-521 in FIG. 5, DNS server 120/130 may obtain second health information 620 from second entity=LB2 150 associated with second site=UK site 102. In the example in FIG. 6, second health information 620 may be generated based on multiple second traffic flows (see 604) between (a) multiple second client devices accessing the global service and (b) second pool 165 of second backend servers 163-164 providing the global service at UK site 102. Example second client devices (see 602) may include Y1, Y2 and Y3 in FIG. 6.

At 530 in FIG. 5, DNS server 120/130 may receive a request from a third client device to access the global service provided by both first pool 160 and second pool 165. In the example in FIG. 6, third client device 103 operated by global service user 104 may generate and send a DNS request (see 630) towards global DNS server 110, which forwards the DNS request to either DNS1 120 at US site 101 or DNS2 130 at UK site 102. DNS request 630 may specify FQDN=app.xyz.com associated with the global service provided by both first pool 160 and second pool 165.

At 540 in FIG. 5, in response to receiving the request, DNS server 120/130 may perform dynamic site selection by selecting US site 101 or UK site 102 (i.e., selected site) based on first health information 610 and/or second health information 620. At 550-551, DNS server 120/130 may generate and send a response towards third client device 103 to cause third client device 103 to access the global service by directing a third traffic flow towards the selected site. In the case of selected site=US site 101, DNS server 120/130 may generate and send a DNS response specifying VIP-US associated with LB1 140. Otherwise (i.e., selected site=UK site 102), the DNS response may specify VIP-UK associated with LB2 150. See 640-660 in FIG. 6.

As will be described further using FIGS. 6-8, first health information 610 may include first mapping information that maps at least one first traffic flow to one of the following: (a) ID1=US associated with US site 101 and (b) ID2=UK associated with UK site 102. Similarly, second health information 610 may include second mapping information that maps at least one second traffic flow to one of the following: (a) ID1=US and (b) ID2=UK. Further, health information 610/620 may include health score(s) such as security score information, network utilization score information and resource utilization score information. See also 511 and 512 in FIG. 5.

Example Health Information for Dynamic Site Selection

Some examples of dynamic site selection will be explained using FIGS. 7-8. In particular, FIG. 7 is a flowchart of example detailed process 700 for a computer system (e.g., DNS1 120 or DNS2 130) to perform dynamic site selection in GSLB environment 100. FIG. 8 is a schematic diagram illustrating example health information 800 for dynamic site selection. In the following examples, blocks 710-745 relating to health information generation may be performed by first entity=LB1 140 associated with US site 101 and second entity=LB2 150 associated with UK site 102.

(a) Health Information Generation by Load Balancer

At 710 in FIG. 7, LB 140/150 (e.g., SIM 141/151) may monitor a set of traffic flows between (a) multiple client devices accessing the global service and (b) backend server pool 160/165 providing the global service at site 101/102. At 715, for each traffic flow with a particular client device, LB 140/150 may determine location information associated with the client device and map the location information to a site ID. The location information may be determined using any suitable approach, such as geo-distance based on IP address as the metric, etc.

Using the example in FIG. 6, LB 140/150 may map the location information to site ID=ID1 associated with DNS1 120 at US site 101 or site ID=ID2 associated with DNS2 130 at UK site 102. In a first example, LB1 140 may monitor a first set of traffic flows between first client devices 601=(X1, X2, X3) and POOL1 160. X1 may be mapped to site ID=ID1 (i.e., US) and (X2, X3) to site ID=ID2 (i.e., UK) based on their location information. In a second example, LB2 150 may monitor a second set of traffic flows between second client devices 602=(Y1, Y2, Y3) and POOL2 165. Here, (Y1, Y2) may be mapped to site ID=ID1 (i.e., US) and Y3 to site ID=ID2 (i.e., UK) based on their location information.

At 720 in FIG. 7, LB 140/150 may generate health information associated with site 101/102. Depending on the desired implementation, the health information may include site ID mapping information (see 715) and score information, such as security score information (denoted as S1; see 721), network utilization score information (denoted as S2; see 722) and resource utilization score information (denoted as S3; see 723). To store various health information, LB 140/150 may create and maintain a site identity (SI) table for site 101/102 being monitored. Some example tables will be described using FIG. 8 below.

Referring to FIG. 8, at 810-820, LB 140/150 may maintain a first table for storing security score information (S1). Each entry in first table 810/820 may specify mapping information that maps a particular traffic flow with a client device to a particular site ID (e.g., ID1=US or ID2=UK), a VIP (e.g., VIP-US or VIP-UK) associated with the site ID. Each entry in first table 810/820 may further specify a security score associated with the traffic flow and a user-configurable threshold for the security score. Any suitable approach may be used to calculate the security score based on any suitable security parameter(s), such as software vulnerability, server security health based on software patches, cryptographic security protocol(s), cipher spec, the use of intrusion detection and prevention systems (IDS/IPS), etc. In practice, the security score may be calculated based on a cipher spec by considering factors such as the strength of encryption algorithm, length of encryption key, etc.

For example, at 810 in FIG. 8, LB1 140 may determine S1(US, X1)=security score for a traffic flow from X1 whose location information is mapped to ID1=US, S1(UK, X2)=security score for a traffic flow from X2 whose location information is mapped to ID2=UK and S1(UK, X3)=security score for a traffic flow from X3 whose location information is mapped to ID2=UK. At 820 in FIG. 8, LB2 150 may perform site ID mapping and determine security scores S1(US, Y1), S1(US, Y2) and S1(UK, Y1) for respective client devices 602=(Y1, Y2, Y3) in a similar manner.

At 830-840 in FIG. 8, LB 140/150 may maintain a second table for storing network utilization score information. Each entry in second table 830/840 may specify mapping information that maps a particular traffic flow with a client device to a particular site ID (e.g., ID1=US or ID2=UK), a VIP (e.g., VIP-US or VIP-UK) associated with the site ID. Each entry in second table 830/840 may further specify a network utilization score associated with the traffic flow and a user-configurable threshold for the network utilization score. The network utilization score may be calculated based on any suitable network parameter(s), such as bandwidth utilization, latency, jitter, throughput, etc.

For example, at 830 in FIG. 8, LB1 140 may determine S2(US, X1)=network utilization score for a traffic flow from X1 whose location information is mapped to ID1=US, S2(UK, X2)=network utilization score for a traffic flow from X2 whose location information is mapped to ID2=UK and S2(UK, X3)=network utilization score for a traffic flow from X3 whose location information is mapped to ID2=UK. At 840 in FIG. 8, LB2 150 may perform site ID mapping and determine network utilization scores S2(US, Y1), S2(US, Y2) and S2(UK, Y1) for respective client devices 602=(Y1, Y2, Y3) in a similar manner.

At 850-860 in FIG. 8, LB 140/150 may maintain a third table for storing resource utilization score information. Each entry in third table 850/860 may specify mapping information that maps a particular traffic flow with a client device to a particular site ID (e.g., ID1=US or ID2=UK), a VIP (e.g., VIP-US or VIP-UK) associated with the site ID. Each entry in third table 850/860 may further specify a resource utilization score associated with the traffic flow and an associated user-configurable threshold. The resource utilization score may be calculated based on any suitable resource-related parameter(s), such as memory utilization, storage utilization, CPU utilization, etc.

For example, at 850 in FIG. 8, LB1 140 may determine S3(US, X1)=resource utilization score for a traffic flow from X1 whose location information is mapped to ID1=US, S3(UK, X2)=resource utilization score for a traffic flow from X2 whose location information is mapped to ID2=UK and S3(UK, X3)=resource utilization score for a traffic flow from X3 whose location information is mapped to ID2=UK. At 860 in FIG. 8, LB2 150 may perform site ID mapping and determine resource utilization scores S3(US, Y1), S3(US, Y2) and S3(UK, Y1) for respective client devices 602=(Y1, Y2, Y3) in a similar manner.

In practice, a network administrator may configure any suitable approach for calculating and recalibrating the health information according to any desired parameter(s) or factor(s). Since the mapping between a client device (i.e., operated by global service user) and a site ID is determined internally at block 715, the score(s) associated with the site ID may be updated at regular interval. For example, of a client device associated with a particular site ID initiates an attack on LB1 140, a web application firewall (WAF) module may detect and mitigate the attack. In response to detecting the attack, LB 140/150 (e.g., SIM 141/151) may recalibrate the security score.

In another example, in response to determination that network utilization score (e.g., bandwidth, latency, jitter, etc.) is higher (e.g., exceeds predetermined threshold) for traffic flow(s) from client device(s) associated with a particular site ID, LB 140/150 (e.g., SIM 141/151) may recalibrate the network utilization score for that site ID. Further, in response to determination that resource utilization (e.g., CPU, memory, storage) is higher (e.g., exceeds predetermined threshold) for incoming traffic from client device(s) associated with a particular site ID, LB 140/150 (e.g., SIM 141/151) may recalibrate the resource utilization score for that site ID. This is to mitigate attack(s) relating to incoming traffic flooding, application server's capacity breach, etc.

Referring to FIG. 7 again, at 730, 735 (no) and 740, in response to receiving a health monitoring request from health monitor 121/131, LB 140/150 (e.g., SIM 141/151) may generate and send health monitoring response via a secure connection that is established according to the examples in FIGS. 1-4. The response may include table 810/820 storing security score information, table 830/840 storing network utilization score information and table 850/860 storing resource utilization score information.

Depending on the desired implementation, LB 140/150 (e.g., SIM 141/151) may stop responding to health monitoring request(s) from HM 121/131 in response to determination that a score threshold is exceeded for a particular site ID. For example, if LB1 140 stops responding to health monitoring request(s), the situation may result in VIP-US being marked with status=UNHEALTHY or DOWN by HM 121/131. This is called dynamic exclusion of a particular VIP. Any subsequent DNS requests will not be responded with the VIP-US to steer application away from site ID=US. See blocks 735 (yes) and 745 in FIG. 7.

(b) Dynamic Site Selection by DNS Server

At 750-755 in FIG. 7, in response to generating and sending a request for health information towards LB 140/150, DNS server 120/130 (e.g., using health monitor 121/131) may receive with first health information from first entity=LB1 140 associated with US site 101 and second health information from second entity=LB2 150 associated with UK site 102.

At 765-770 in FIG. 7, in response to receiving a DNS request specifying FQDN=app.xyz.com from global service user 104 operating client device 103, DNS server 120/130 may determine site-level health information based on first health information from LB1 140 (see 610/611 in FIG. 6) and second health information from LB2 150 (see 620/621 in FIG. 6). Depending on the desired implementation, the site-level health information may be calculated by LB 140/150 and provided to DNS server 120/130. Alternatively, the site-level health information may be calculated by DNS server 120/130. In practice, the DNS request may be forwarded by global DNS server 110 towards DNS1 120 at US site 101 or DNS2 130 at UK site 102.

For example, at 870 in FIG. 8, a site-level security score denoted as S1(US) may be calculated as a first function (f) of security score information associated with traffic flow(s) mapped to ID1=US. A site-level network utilization score denoted as S2(US) may be calculated as a second function (f) of network utilization score information associated with traffic flow(s) mapped to ID1=US. A site-level resource utilization score denoted as S3(US) may be calculated as a third function (f) of resource utilization score information associated with traffic flow(s) mapped to ID1=US. For simplicity, threshold=75% for S1(US), S2(US) and S3(US).

Further, at 880 in FIG. 8, a site-level security score denoted as S1(UK) may be calculated as a function (f) of security score information associated with traffic flow(s) mapped to ID2=UK. A site-level network utilization score denoted as S2(UK) may be calculated as a function (f) of network utilization score information associated with traffic flow(s) mapped to ID2=UK. A site-level resource utilization score denoted as S3(UK) may be calculated as a function (f) of resource utilization score information associated with traffic flow(s) mapped to ID2=UK. For simplicity, threshold=50% for S1(UK), S2(UK) and S3(UK).

At 775 in FIG. 7, DNS server 120/130 may perform dynamic site selection according to any suitable policy based on first health information from LB1 140 and/or second health information from LB2 150. For example, block 775 may include DNS server 120/130 determining whether the security score, network utilization score or resource utilization score associated with a particular site ID exceeds a predetermined threshold. If not (i.e., threshold not exceeded), DNS server 120/130 may select the site ID. Otherwise (i.e., threshold exceeded), DNS server 120/130 may mark the site ID as having status=UNHEALTHY or DOWN and select a different site.

At 780 in FIG. 7, DNS server 120/130 may generate a DNS response specifying a VIP associated with the selected site (e.g., A-record specifying VIP-UK) and send the DNS response towards client device 103. This is to cause client device 103 to generate and send application traffic towards LB2 150 associated with VIP-UK, thereby directing or steering the traffic towards UK site 102. LB2 150 may perform load balancing by selecting one of backend servers 163-164 to handle the application traffic (e.g., service request processing). See also 630-660 in FIG. 6.

Physical Implementation View

Figure 9:
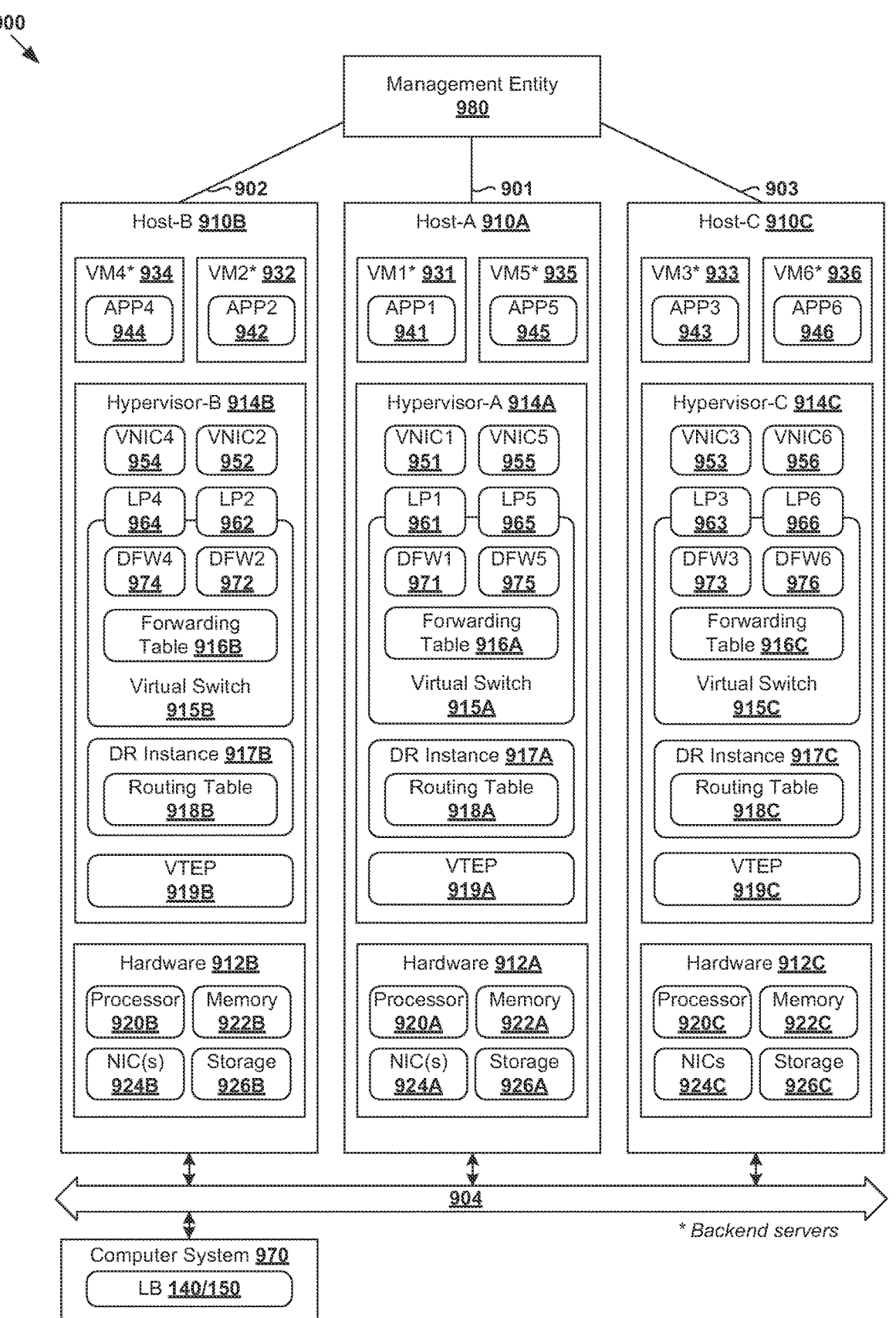
FIG. 9 is a schematic diagram illustrating a physical implementation view of backend servers in an example software-defined networking (SDN) environment.

Example backend servers 161-164 will be explained using VMs 931-936 in FIG. 9, which is a schematic diagram illustrating a physical implementation view of backend servers in example software-defined networking (SDN) environment 900. Depending on the desired implementation, SDN environment 900 may include additional and/or alternative components than that shown in FIG. 9. For example, SDN environment 900 may include multiple physical hosts, such as host-A 910A, host-B 910B and host-C 910C that are inter-connected via physical network 904. Note that SDN environment 900 may include any number of hosts (also known as a "host computers", "host devices", "physical servers", "server systems", "transport entities," etc.), where each host may be supporting tens or hundreds of VMs.

Each host 910A/910B/910C may include suitable hardware 912A/912B/912C and virtualization software (e.g., hypervisor-A 914A, hypervisor-B 914B, hypervisor-C 914C) to support various VMs. For example, hosts 910A-C may support respective VMs 931-936 (see also FIG. 9). Hypervisor 914A/914B/914C maintains a mapping between underlying hardware 912A/912B/912C and virtual resources allocated to respective VMs. Hardware 912A/912B/912C includes suitable physical components, such as central processing unit(s) (CPU(s)) or processor(s) 920A/920B/920C; memory 922A/922B/922C; physical network interface controllers (NICs) 924A/924B/924C; and storage disk(s) 926A/926B/926C, etc.

Virtual resources are allocated to respective VMs 931-936 to support a guest operating system (OS) and application(s). For example, VMs 931-936 support respective applications 941-946 (see "APP1" to "APP6"). The virtual resources may include virtual CPU, guest physical memory, virtual disk, virtual network interface controller (VNIC), etc. Hardware resources may be emulated using virtual machine monitors (VMMs). For example in FIG. 9, VNICs 951-956 are virtual network adapters for VMs 931-936, respectively, and are emulated by corresponding VMMs (not shown for simplicity) instantiated by their respective hypervisor at respective host-A 910A, host-B 910B and host-C 910C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

Although explained using VMs 931-936, it should be understood that SDN environment 900 may include other virtual workloads, such as containers, etc. As used herein, the term "container" (also known as "container instance") is used generally to describe an application that is encapsulated with all its dependencies (e.g., binaries, libraries, etc.). For example, container technologies may be used to run various containers inside respective VMs 931-936. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

The term "hypervisor" may refer generally to a software layer or component that supports the execution of multiple virtualized computing instances, including system-level software in guest VMs that supports namespace containers such as Docker, etc. Hypervisors 914A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-9" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 914A/914B/914C implements virtual switch 915A/915B/915C and logical distributed router (DR) instance 917A/917B/917C to handle egress packets from, and ingress packets to, corresponding VMs. To protect VMs 931-936 against security threats caused by unwanted packets, hypervisors 914A-C may implement firewall engines to filter packets. For example, distributed firewall (DFW) engines 971-976 (see "DFW1" to "DFW6") are configured to filter packets to, and from, respective VMs 931-936 according to firewall rules. In practice, network packets may be filtered according to firewall rules at any point along a datapath from a VM to corresponding physical NIC 924A/924B/924C. For example, a filter component (not shown) is incorporated into each VNIC 951-956 that enforces firewall rules that are associated with the endpoint corresponding to that VNIC and maintained by respective DFW engines 971-976.

Through virtualization of networking services in SDN environment 900, logical networks (also referred to as overlay networks or logical overlay networks) may be provisioned, changed, stored, deleted and restored programmatically without having to reconfigure the underlying physical hardware architecture. A logical overlay network may be formed using any suitable tunneling protocol, such as Virtual extensible Local Area Network (VXLAN), Stateless Transport Tunneling (STT), Generic Network Virtualization Encapsulation (GENEVE), etc. For example, VXLAN is a layer-9 overlay scheme on a layer-3 network that uses tunnel encapsulation to extend layer-9 segments across multiple hosts, which may reside on different layer 9 physical networks. Hypervisor 914A/914B/914C may implement virtual tunnel endpoint (VTEP) 919A/919B/919C to perform encapsulation and decapsulation for packets that are sent via a logical overlay tunnel that is established over physical network 904.

In practice, logical switches and logical routers may be deployed to form logical networks in a logical network environment. The logical switches and logical DRs may be implemented in a distributed manner and can span multiple hosts. For example, logical switches that provide first-hop, logical layer-9 connectivity (i.e., an overlay network) may be implemented collectively by virtual switches 915A-C and represented internally using forwarding tables 916A-C at respective virtual switches 915A-C. Forwarding tables 916A-C may each include entries that collectively implement the respective logical switches. VMs that are connected to the same logical switch are said to be deployed on the same logical layer-9 segment. Further, logical DRs that provide logical layer-3 connectivity may be implemented collectively by DR instances 917A-C and represented internally using routing tables 918A-C at respective DR instances 917A-C. Routing tables 918A-C may each include entries that collectively implement the respective logical DRs. As used herein, the term "logical network element" may refer generally to a logical switch, logical router, logical port, etc.

Packets may be received from, or sent to, each VM via an associated logical port. For example, logical switch ports 961-966 (see "LP1" to "LP6") are associated with respective VMs 931-936. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 915A-C in FIG. 9, whereas a "virtual switch" may refer generally to a software switch or software implementation of a physical switch. In practice, there is usually a one-to-one mapping between a logical port on a logical switch and a virtual port on virtual switch 915A/915B/915C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

In a data center with multiple tenants requiring isolation from each other, a multi-tier topology may be used. For example, a two-tier topology includes an upper tier-0 (T0) associated with a provider logical router (PLR) and a lower tier-1 (T1) associated with a tenant logical router (TLR). The multi-tiered topology enables both the provider (e.g., data center owner) and tenant (e.g., data center tenant) to control their own services and policies. Each tenant has full control over its T1 policies, whereas common T0 policies may be applied to different tenants. A T0 logical router may be deployed at the edge of a geographical site to act as gateway between internal logical network and external networks, and also responsible for bridging different T1 logical routers associated with different data center tenants.

Further, a logical router may be a logical DR or logical service router (SR). A DR is deployed to provide routing services for VM(s) and implemented in a distributed manner in that it may span multiple hosts that support the VM(s). An SR is deployed to provide centralized stateful services, such as IP address assignment using dynamic host configuration protocol (DHCP), intrusion detection, load balancing, network address translation (NAT), etc. In practice, SRs may be implemented using edge appliance(s), which may be VM(s) and/or physical machines (i.e., bare metal machines). SRs are capable of performing functionalities of a switch, router, bridge, gateway, edge appliance, or any combination thereof. As such, a logical router may be one of the following: T1-DR, T1-SR (i.e., T1 gateway), T0-DR and T0-SR.

Management entity 980 (e.g., SDN manager or SDN controller) may be implemented using physical machine(s), VM(s), or both in SDN environment 900. One example of an SDN controller is the NSX controller component of VMware NSX® (available from VMware, Inc.). The SDN controller may be a member of a controller cluster (not shown for simplicity) that is configurable using an SDN manager. For example, logical switches, logical routers, and logical overlay networks may be configured using SDN controller, SDN manager, etc. To send or receive control information, a local control plane (LCP) agent (not shown) on host 910A/910B/910C may interact with management entity 980 via control-plane channel 901/902/903. VMs 931-936 may interact with computer system 970 implementing load balancer 140/150 via any suitable physical network 904.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 9.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a computer system to perform connection establishment in a global server load balancer (GSLB) environment that includes at least a first site and a second site, wherein the method comprises:

establishing a first connection with a first entity associated with the first site based on first parameter information that includes (a) a shared certificate and (b) a first identifier (ID) that is uniquely associated with the first entity or the first site, the shared certificate being shared by multiple entities that include the first entity and a second entity;

establishing a second connection with the second entity associated with the second site based on second parameter information that includes (a) the shared certificate and (b) a second ID that is uniquely associated with the second entity or the second site;

in response to receiving a first request from the first entity associated with the first site via the first connection, generating and sending a first response towards the first entity via the first connection; and in response to receiving a second request from the second entity associated with the second site via the second connection, generating and sending a second response towards the second entity via the second connection.

2. The method of claim 1, wherein establishing the first connection comprises:

receiving, from the first entity acting as a first client, a first connection establishment packet that includes (a) the shared certificate and (b) the first ID, wherein the first ID is included in a type-length-value (TLV) option field in the first connection establishment packet; and performing identity verification of the first entity based on the shared certificate in the first connection establishment packet.

3. The method of claim 1, wherein establishing the second connection comprises:

receiving, from the second entity acting as a second client, a second connection establishment packet that includes (a) the shared certificate and (b) the second ID, wherein the shared certificate and the second ID are encoded in a secure token format in the second connection establishment packet; and performing identity verification of the second entity based on the shared certificate in the second connection establishment packet.

4. The method of claim 1, wherein establishing the first connection and the second connection comprises:

establishing, by the computer system acting as a server, (a) the first connection with the first entity acting as a first client and (b) the second connection with the second entity acting as a second client, the shared certificate being sent from the first site towards the second site via a management channel.

5. The method of claim 1, wherein the method further comprises:

generating health information based on multiple traffic flows between (a) multiple client devices accessing a service and (b) a pool of backend servers providing the service, wherein the pool is accessible via the computer system in the form of a load balancer.

6. The method of claim 5, wherein the method further comprises:

generating the health information to include (a) mapping information that maps at least one of the multiple traffic flows to the first ID or the second ID and (b) one or more of the following health scores: security score, network utilization score and resource utilization score.

7. The method of claim 5, wherein generating the first response and the second response comprises:

generating the first response to include the health information and sending the first response towards the first entity in the form of a first health monitor associated with a first domain name system (DNS) server; and generating the second response to include the health information and sending the second response towards the second entity in the form of a second health monitor associated with a second DNS server.

8. A non-transitory computer-readable storage medium that includes a set of instructions which, in response to execution by a processor of a computer system, cause the processor to perform a method of connection establishment in a global server load balancer (GSLB) environment that includes at least a first site and a second site, wherein the method comprises:

establishing a first connection with a first entity associated with the first site based on first parameter information that includes (a) a shared certificate and (b) a first identifier (ID) that is uniquely associated with the first entity or the first site, the shared certificate being shared by multiple entities that include the first entity and a second entity;

establishing a second connection with the second entity associated with the second site based on second parameter information that includes (a) the shared certificate and (b) a second ID that is uniquely associated with the second entity or the second site;

in response to receiving a first request from the first entity associated with the first site via the first connection, generating and sending a first response towards the first entity via the first connection; and in response to receiving a second request from the second entity associated with the second site via the second connection, generating and sending a second response towards the second entity via the second connection.

9. The non-transitory computer-readable storage medium of claim 8, wherein establishing the first connection comprises:

receiving, from the first entity acting as a first client, a first connection establishment packet that includes (a) the shared certificate and (b) the first ID, wherein the first ID is included in a type-length-value (TLV) option field in the first connection establishment packet; and performing identity verification of the first entity based on the shared certificate in the first connection establishment packet.

10. The non-transitory computer-readable storage medium of claim 8, wherein establishing the second connection comprises:

receiving, from the second entity acting as a second client, a second connection establishment packet that includes (a) the shared certificate and (b) the second ID, wherein the shared certificate and the second ID are encoded in a secure token format in the second connection establishment packet; and performing identity verification of the second entity based on the shared certificate in the second connection establishment packet.

11. The non-transitory computer-readable storage medium of claim 8, wherein establishing the first connection and the second connection comprises:

establishing, by the computer system acting as a server, (a) the first connection with the first entity acting as a first client and (b) the second connection with the second entity acting as a second client, the shared certificate being sent from the first site towards the second site via a management channel.

12. The non-transitory computer-readable storage medium of claim 8, wherein the method further comprises:

generating health information based on multiple traffic flows between (a) multiple client devices accessing a service and (b) a pool of backend servers providing the service, wherein the pool is accessible via the computer system in the form of a load balancer.

13. The non-transitory computer-readable storage medium of claim 12, wherein the method further comprises:

generating the health information to include (a) mapping information that maps at least one of the multiple traffic flows to the first ID or the second ID and (b) one or more of the following health scores: security score, network utilization score and resource utilization score.

14. The non-transitory computer-readable storage medium of claim 12, wherein generating the first response and the second response comprises:

generating the first response to include the health information and sending the first response towards the first entity in the form of a first health monitor associated with a first domain name system (DNS) server; and generating the second response to include the health information and sending the second response towards the second entity in the form of a second health monitor associated with a second DNS server.

15. A method for an entity, being a first entity, to perform connection establishment in a global server load balancer (GSLB) environment that includes at least a first site and a second site, wherein the method comprises:

obtaining a shared certificate and a first identifier (ID), wherein the shared certificate is shared by multiple entities that include the first entity associated with the first site and a second entity associated with the second site, and the first ID is uniquely associated with the first entity or the first site;

establishing a first connection with a computer system based on first parameter information that includes (a) the shared certificate and (b) the first ID, wherein a load balancer is capable of establishing a second connection with the second entity based on second parameter information that includes (a) the shared certificate and (b) a second ID that is uniquely associated with the second entity or the second site;

generating and sending, via the first connection, a request for health information towards the computer system via the first connection; and receiving, from the computer system via the first connection, a response that includes the health information.

16. The method of claim 15, wherein establishing the first connection comprises:

generating and sending, towards the computer system, a first connection establishment packet that includes (a) the shared certificate and (b) the first ID, wherein the first ID is included in a type-length-value (TLV) option field in the first connection establishment packet.

17. The method of claim 15, wherein establishing the first connection comprises:

establishing the first connection between (a) the first entity in the form of health monitor configured for a service and (b) the computer system that implements the load balancer via which a pool of backend servers providing the service are accessible.

18. The method of claim 17, wherein establishing the first connection comprises:

generating and sending, towards the computer system, a first connection establishment packet that includes (a) the shared certificate and (b) the first ID, wherein the shared certificate and the first ID are encoded in a secure token format in the second connection establishment packet.

19. The method of claim 15, wherein obtaining the shared certificate comprises:

obtaining the shared certificate from one of the following: (a) a management entity or (b) the second site via a management channel.

20. The method of claim 15, wherein receiving the response comprises:

receiving the response that includes the health information that is generated based on multiple traffic flows between (a) multiple client devices accessing a service and (b) a pool of backend servers providing the service, wherein the pool is accessible via the computer system in the form of the load balancer.

21. The method of claim 15, wherein receiving the response comprises:

receiving the response that includes the health information that includes (a) mapping information that maps at least one of the multiple traffic flows to the first ID or the second ID and (b) one or more of the following health scores: security score, network utilization score and resource utilization score.

* * * * *